United States Patent
Ushida

(10) Patent No.: US 6,253,095 B1
(45) Date of Patent: Jun. 26, 2001

(54) TELEPHONE SET, COMMUNICATIONS SYSTEM, AND METHOD OF SETTING SECURITY FUNCTIONS IN TELEPHONE SET

(75) Inventor: Bunji Ushida, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/917,966

(22) Filed: Aug. 27, 1997

(30) Foreign Application Priority Data

Mar. 21, 1997 (JP) .................................................. 9-068091

(51) Int. Cl.⁷ ...................................................... H04B 1/38
(52) U.S. Cl. .......................... 455/565; 455/411; 455/550; 379/93.02; 379/200
(58) Field of Search .................................... 455/565, 410, 455/411, 550, 405, 406, 403, 564; 379/93.02, 200, 199, 433, 355

(56) References Cited

U.S. PATENT DOCUMENTS

| | | | |
|---|---|---|---|
| 4,482,787 | * 11/1984 | Sagara et al. | 379/200 |
| 4,813,068 | 3/1989 | Hashimoto | 379/70 |
| 4,953,202 | * 8/1990 | Newell | 379/200 |
| 4,965,459 | * 10/1990 | Murray | 379/189 |
| 5,040,177 | * 8/1991 | Martin et al. | 370/259 |
| 5,200,995 | * 4/1993 | Gaukel et al. | 379/200 |
| 5,303,285 | * 4/1994 | Kerihuel et al. | 455/461 |
| 5,392,356 | * 2/1995 | Konno et al. | 380/23 |
| 5,444,764 | * 8/1995 | Galecki | 455/411 |
| 5,646,604 | * 7/1997 | Maruyama et al. | 340/825.31 |
| 5,809,126 | * 9/1998 | Smith et al. | 379/200 |
| 5,850,599 | * 12/1998 | Seiderman | 455/406 |
| 5,884,193 | * 3/1999 | Kaplan | 455/565 |
| 5,903,833 | * 5/1999 | Jonsson et al. | 455/417 |

FOREIGN PATENT DOCUMENTS

2104347A * 3/1983 (GB) ............................ H04M/1/66
61-236226   10/1986 (JP) .

* cited by examiner

*Primary Examiner*—Dwayne Bost
*Assistant Examiner*—Sonny Trinh

(57) ABSTRACT

When setting a call, a telephone number, a discrimination code for discriminating a telephone number from an identification number, and an identification number to unlock specified call restriction are continuously inputted by way of key operations in a key entry section for forming call-setting information the identification number is determined from the call-setting information in the control section; and the determined identification number is collated with an identification number previously registered, and if the two identification numbers are identical to each other, the specified call restriction is unlocked with call setting executed.

18 Claims, 11 Drawing Sheets

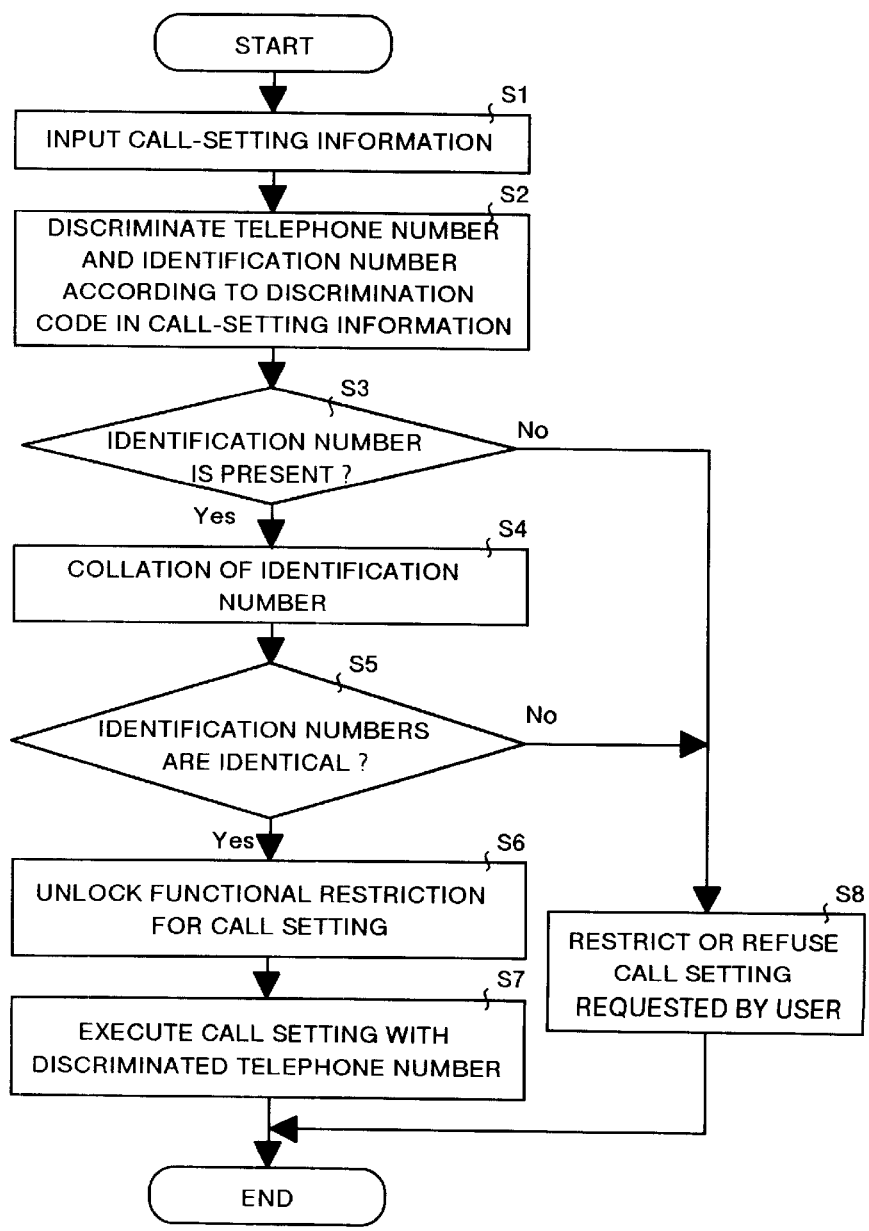

TELEPHONE SET, COMMUNICATIONS SYSTEM, AND METHOD OF SETTING SECURITY FUNCTIONS IN TELEPHONE SET

FIELD OF THE INVENTION

The present invention relates to a telephone set such as a portable telephone set or the like having security functions for preventing a third party from unauthorized use thereof, a communication system with the security functions provided in a side of a network, and to a method of setting the security functions therein.

BACKGROUND OF THE INVENTION

Provided in this type of telephone set is, generally, a security function (described as a locking function hereinafter) with which the telephone set is disabled to be used unless a correct identification number is inputted thereinto to prevent any person other than an authorized owner of the telephone set from using it without authorization. Namely, the locking function is unlocked in response to input of the correct identification number thereinto.

As a conventional technology relating to this type of locking function, there is Japanese Patent Laid-Open Publication No. SHO 61-236226. In this Publication, there is disclosed a technology that calls are transmitted from a mobile telephone set or received thereby by inputting an identification number thereto at the time of using the mobile telephone set and obtaining identification by collating it to the identification number previously stored therein.

There has been proposed a telephone set in which a security function is provided so that a particular number such as a telephone number for a long-distance call or the like (described as a call-restricting function hereinafter) is restricted. In this case, the call-restricting function is also unlocked in response to input of a correct identification number thereinto.

In the conventional type of telephone set as disclosed in the publication, unlocking of a locking function and a call-restricting function is first set according to input of an identification number and call setting is carried out, which makes the operations complicated.

After the call is unlocked, and when prevention of unauthorized use of a telephone set or a restriction of particular numbers are also required for the next use thereof, the locking function and the call-restricting function are necessary to be set again, which makes the setting of a security function therein troublesome.

SUMMARY OF THE INVENTION

It is an object of the present invention to obtain a telephone set and a communication system each in which setting operations for a call following security functions can be simplified, and also to obtain a method of setting security functions in a telephone set.

It is another object of the present invention to obtain a telephone set and a communication system in which setting operations for security functions can be simplified and also to obtain a method of setting security functions in a telephone set.

With a telephone set according to the present invention, when setting a call, a user inputs call-setting information including a telephone number and an identification number; the identification number is determined from the call-setting information and is collated to the previously registered identification number; and specified call restriction is unlocked only when the inputted identification number and the previously registered one are identical, so that an input operation when setting a call is to be executed only once, which makes it possible to simplify the operation for call setting.

With a telephone set according to the present invention, a telephone number and an identification number inputted all at once are discriminated from each other by checking a discrimination code, so that, when inputting call-setting information, it is possible to continuously input a telephone number and an identification number by inputting a discrimination code.

With a telephone set according to the present invention, when an identification number is not determined, the user is asked to input the identification number again, so that, even if input miss for an identification number occurs or an identification number is not inputted, the user can complete input of correct information before call setting is executed, and with this feature, the necessity for retry of call setting can be eliminated.

With a telephone set according to the present invention, even if call restriction is once unlocked for execution of call setting, the call restrictions are automatically set again, so that it is possible to prevent a user from forgetting execution of an operation for call restriction and also trouble for setting the call restriction again is saved, and with this feature it is possible to simplify an operation for setting the security function while maintaining the security function.

With a communication system according to the present invention, when setting a call, a user inputs call-setting information including a telephone number and an identification number in the side of a telephone set; the call-setting information is transmitted to a base station; the base station receives the call-setting information, determines an identification number from the call-setting information to collate it to the previously registered identification number, and unlocks call restriction and executes call setting when the inputted identification number and the previously registered identification number are identical, so that an operation for inputting when setting a call is to be executed only once in the side of a telephone set, and with this feature the call setting operation following security functions on the system can be simplified.

With a communication system according to the present invention, a telephone number and an identification number inputted all at once in the side of a telephone set are discriminated by checking a discrimination code in the side of a base station, so that, when inputting call-setting information in the side of a telephone set, it becomes possible to continuously input an telephone number and an identification number on the condition that also a discrimination code is inputted, so that collation of an identification number and call setting can be executed in batch in the side of the base station.

With a communication system according to the present invention, when an identification number inputted in the side of a telephone set can not be identified, a base station requests a user to input the identification number again, so that, even if an user makes a mistake in or forgets inputting an identification number, the user can complete a correct operation for inputting call-setting information, and with this feature, the necessity for executing an operation for call setting again on the system is eliminated.

With a communication system according to the present invention, even if call restriction is unlocked for execution of call setting, the call restriction is automatically set, so that a work load for a user to set call setting in a telephone set is eliminated and also trouble for setting the call restriction again in the side of a telephone set is saved, and with this feature the operation for setting security functions on the system can be simplified while maintaining the security functions.

With a method of setting security functions for a telephone set according to the present invention, call-setting information including a telephone number and an identification number is inputted when setting a call; the identification number is determined from the call-setting information and collected to a previously registered identification number; and call restriction is unlocked and call setting is executed only when the inputted identification number and the previously registered one are identical, so that an operation for inputting when setting a call is to be executed only once, and with this feature the call setting operation following the security functions can be simplified.

With a method of setting security functions for a telephone set according to the present invention, a telephone number and an identification number inputted all at once are discriminated from each other by checking a discrimination code, so that a telephone number and an identification number can continuously be inputted on the condition that also a discrimination code is inputted simultaneously.

With a method of setting security functions for a telephone set according to the present invention, when an identification number can not be determined, a user is prompted to input the identification number again, so that, even if a mistakes occurs in inputting an identification number or an identification number is not inputted, the user can complete a correct operation for inputting call-setting information before call setting is executed, and with this feature the necessity to execute call setting again is eliminated.

With a method of setting security functions for a telephone set according to the present invention, even if call restriction is unlocked once for execution of call setting, the call restriction is automatically set again, so that a user is prevented from forgetting execution of an operation for setting the call restriction and also a work load for setting the call restriction again is saved, and with this feature an operation for setting the security functions can be simplified while maintaining the security functions.

Other objects and features of this invention will become understood from the following description with reference to the accompanying drawings.

BRIEF DESCRIPTION OF THE DRAWINGS

FIG. 2 is a view showing an example of a format of data for call setting according to Embodiment 1;

FIG. 3 is a flow chart for explanation of call-setting operations according to Embodiment 1;

DESCRIPTION OF THE PREFERRED EMBODIMENTS

Detailed description is made hereinafter for preferred embodiments of the telephone set, communication system, and method of setting security functions in a telephone set according to the present invention with reference to the related drawings.

Figure 1:
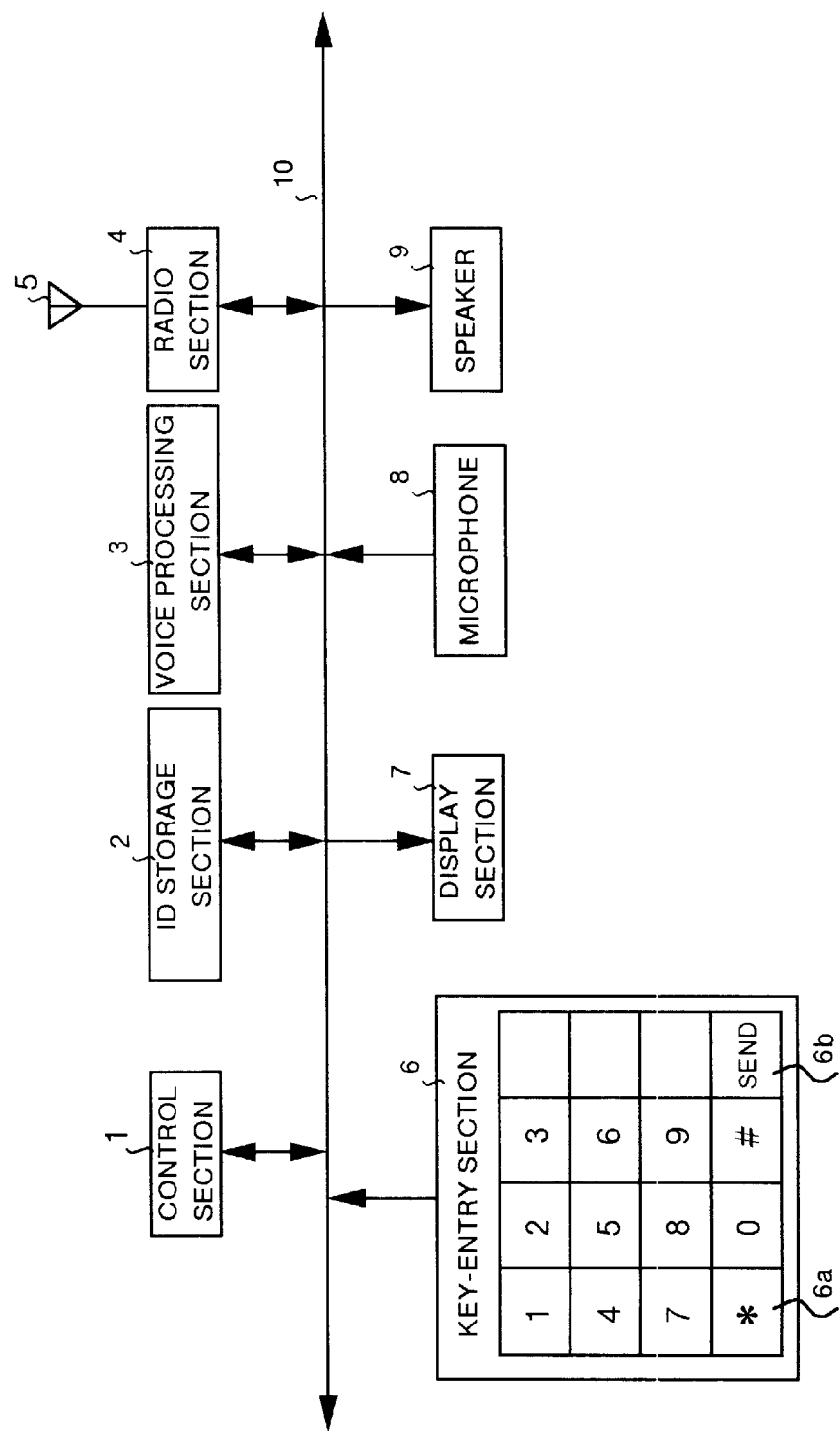
FIG. 1 is a block diagram showing internal configuration of a telephone set according to Embodiment 1 of the present invention.

The description made hereinafter assumes a case of a portable telephone set such as a PHS (Personal Handy Phone System) in which call setting is executed through a radio communication with a base station. FIG. 1 is a block diagram showing internal configuration of a telephone set according to Embodiment 1 of the present invention. The telephone set shown in FIG. 1 comprises units such as a control section 1, an ID (identification number) storage section 2, a voice processing section 3, a radio section 4, an antenna 5, a key-entry section 6, a display section 7, a microphone 8, and a speaker 9 each connected to an internal bus 10 for transferring addresses, data, and control signals or the like therethrough.

The control section 1 comprises, although it is not shown herein, a CPU operating according to a control program, a ROM for storing therein the control program, and a RAM used as a work area for the CPU, and controls each of the units connected to the internal bus 10 in accordance with the control program stored in the ROM. It should be noted that a control program according to the flow chart shown in FIG. 3 is included in a call-setting program stored in the ROM. The contents of the control by this control section 1 cover an operation of verifying an identification number based on an identification number to be stored in the ID storage section 2, an operation of voice processing in the voice processing section 3, an operation of data transaction in the radio section 4, an operation of key entry through the key entry section 6, an operation of display in the display section 7, an operation of voice input through the microphone 8, and an operation of voice output through the speaker 9 or the like.

The ID storage section 2 is a memory, to prevent a third party from executing unauthorized use of a telephone set, for previously storing therein identification numbers each collated to an inputted identification number. The voice processing section 3 is an audio CODEC for modulating an speech signal inputted therein through the microphone 8 to output the signal to the radio section 4 and demodulating an speech signal (modulated signal) inputted from the radio section 4, when it is a voice communication, to output a voice to the speaker 9.

The radio section 4 is a radio unit connected to the antenna 5 for radio signal transaction through the antenna 5.

The antenna 5 captures radio waves (radio signals) sent from a base station not shown herein, and sends out electric waves (radio signals) to the base station.

The key entry section 6 has keys such as numeric keys, a "*" key 6a, a "SEND" key 6b, and function keys or the like, and supplies a key-entry signal detected according to an input operation through each key to the control section 1. It should be noted that the "*" key 6a is used for inputting discrimination code for an identification number and the "SEND" key 6b is used for instructing call setting at the time of setting a call.

The display section 7 is a display unit such as an LCD or an EL or the like, and displays input information through the key entry section 6, data received from the base station which is not shown herein, and a state how the telephone set is working. The microphone 8 is an input unit for supplying input voice to the voice processing section 3 as an speech signal, and the speaker 9 is an output unit for voice-outputting an speech signal received from the voice processing section 3.

Next description is made for call-setting information. FIG. 2 is a view showing an example of a format for call-setting information according to Embodiment 1, and the reference code DT indicates call-setting information, TEL indicates a telephone number, DC indicates discrimination code for discriminating a telephone number from an identification number, and ID indicates an identification number respectively.

The call-setting information DT is input information for setting a call with a party of call connection (a called party or a party of data communications) and has a format comprising a telephone number TEL, discrimination code DC, and an identification number ID. It should be noted that the discrimination code DC indicates data inputted through operation of the "*" key 6a in the key entry section 6.

Next description is made for operations. FIG. 3 is a flow chart for explanation of call-setting operations according to Embodiment 1. In the operations, it is assumed that the power source has already been turned ON so that a call or a data communication is ready to be executed.

When a call is to be set, at first, call-setting information is inputted through key operations in the key entry section 6 in the order of a telephone number TEL, discrimination code DC, and an identification number ID (step S1). The control section 1 confirms an end of inputting the call-setting information according to the operation of the "SEND" key 6b in the key entry section 6.

When a telephone number TEL of "123-456-7890" and an identification number ID of "1111" are to be inputted, at first, input of numbers in the order of 1, 2, 3 . . . 9, 0 with the ten key, input of discrimination code with the "*" key 6a, and further input of numbers in the order of 1, 1, 1, 1 with the numeric keys may successively be executed. Then, when the "SEND" key 6b is operated, data "1234567890 * 1111" which has been inputted before the "SEND" key is operated is stored in the RAM of the control section 1 as call-setting information DT. Description is made hereinafter for the operations according to this example.

Before call setting is executed, the discrimination code DC (*) is detected from the call-setting information DT inputted in step S1. Namely, input of the identification number ID is checked. When the discrimination code DC (*) is detected in this detecting operation, it is determined according to the detected discrimination code DC (*) that, in the inputted call-setting information DT, the data inputted before the discrimination code DC (*) is a telephone number TEL and the data inputted after the discrimination code DC (*) is an identification number ID. With this determination, the call-setting information DT is separated into the telephone number TEL (1234567890) and the identification number ID (1111), and each of the numbers is stored in the RAM of the control section 1 as one unit of discrete data respectively.

When the discrimination code DC is not detected from the inputted call-setting information DT, it is determined that an identification number ID does not exist in the call-setting information DT, which makes it impossible to discriminate the telephone number from the identification number (step S2).

Accordingly, when an identification number ID is present therein (step S3), the identification number ID previously stored in the ID storage section 2 and the identification number ID discriminated in step S2 are collated with each other (step S4). As a result, if the identification number in the ID storage section 2 is "1111", both of the numbers are identical to each other (step S5), and in this case, the functional restriction for call setting previously set in the telephone set is unlocked (step S6). It should be noted that the functional restriction for this call setting includes a locking function for call setting to prevent a third party from executing unauthorized use of a telephone set and a restricting function of particular numbers (a telephone number with which a long-distance call will be made or the like). With either of the functions, effects as security functions can be achieved.

As described above, when the functional restriction for call setting is unlocked, the telephone number TEL discriminated in step S2 is read out from the RAM, and the call setting is executed according to the telephone number TEL (step S7).

When discrimination can not be executed in step S2 and existence of an identification number in data is not recognized in step S3, or when the identification number in the ID storage section 2 is "2222" which indicates that both identification numbers are not identical to each other, it is determined that the current request for call setting does not satisfy the necessary conditions. As a result, the call setting requested by the user is refused (e.g. the locking function) or restricted (e.g. the function of restricting a particular number) according to the functional restriction for call setting preset in the telephone set (step S8).

It should be noted that, for the functional restriction for call setting, a flag, for instance, may be provided in the control section 1 so that the CPU can determine the data by correlating an ON/OFF state of the flag with a setting/unlocking state of the restriction thereof respectively. Accordingly, when a functional restriction in call setting is set, the flag is set to be ON and when the restriction is unlocked, the flag is reset to be OFF.

As described above, with Embodiment 1, call-setting information DT including a telephone number TEL and an identification number ID is inputted into a telephone set at the time of setting a call, the identification number ID is determined from the call-setting information DT and collated with the previously stored identification number, and only when it is determined that both the identification numbers are identical to each other, the specified call restriction is unlocked and call setting is executed, so that input at the time of setting a call can be executed with one operation, which makes it possible to simplify the operations for call setting following the security functions.

Also, a telephone number TEL and an identification number ID inputted with one operation can be discriminated from each other with discrimination code DC, so that a telephone number TEL as well as an identification number ID can continuously be inputted if the discrimination code DC is inputted therebetween at the time of inputting call-setting information DT into a telephone set.

In the embodiment 1, an identification number is verified at the side of a telephone set, but like in Embodiment 2 as described below, an identification number may be verified at the side of a network. It should be noted that, in Embodiment 2, a telephone set is also configured by the blocks (Refer to FIG. 1), like in Embodiment 1, including the key-entry section 6 through which call-setting information DT (Refer to FIG. 2) can be obtained by successively inputting a telephone number TEL, discrimination code DC, and an identification number ID to the telephone set.

Figure 4:
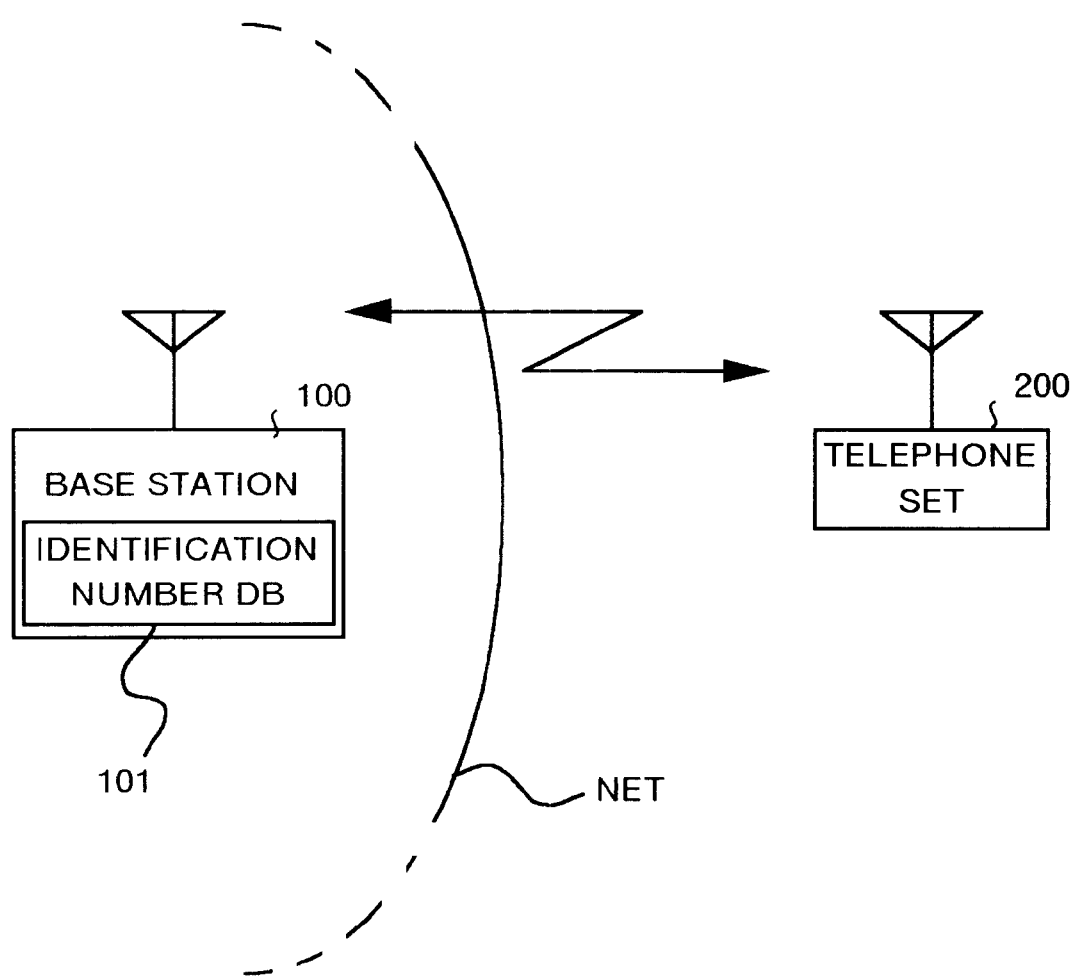
FIG. 4 is a view showing one example of a communication system according to Embodiment 2 of the present invention.

At first, description is made for a communication system according to Embodiment 2. FIG. 4 is a view showing one example of communication system according to Embodiment 2 of the present invention. The communication system shown in FIG. 4 comprises a base station 100 positioned at the side of a network NET as well as a telephone set (only one unit of telephone set 200 is shown herein as an example) connected to each other through radio communications. Provided in the base station 100 is an identification-number DB (database) 101, and in this communication system, a verifying function of identification numbers is added to the base station 100.

Figure 5:
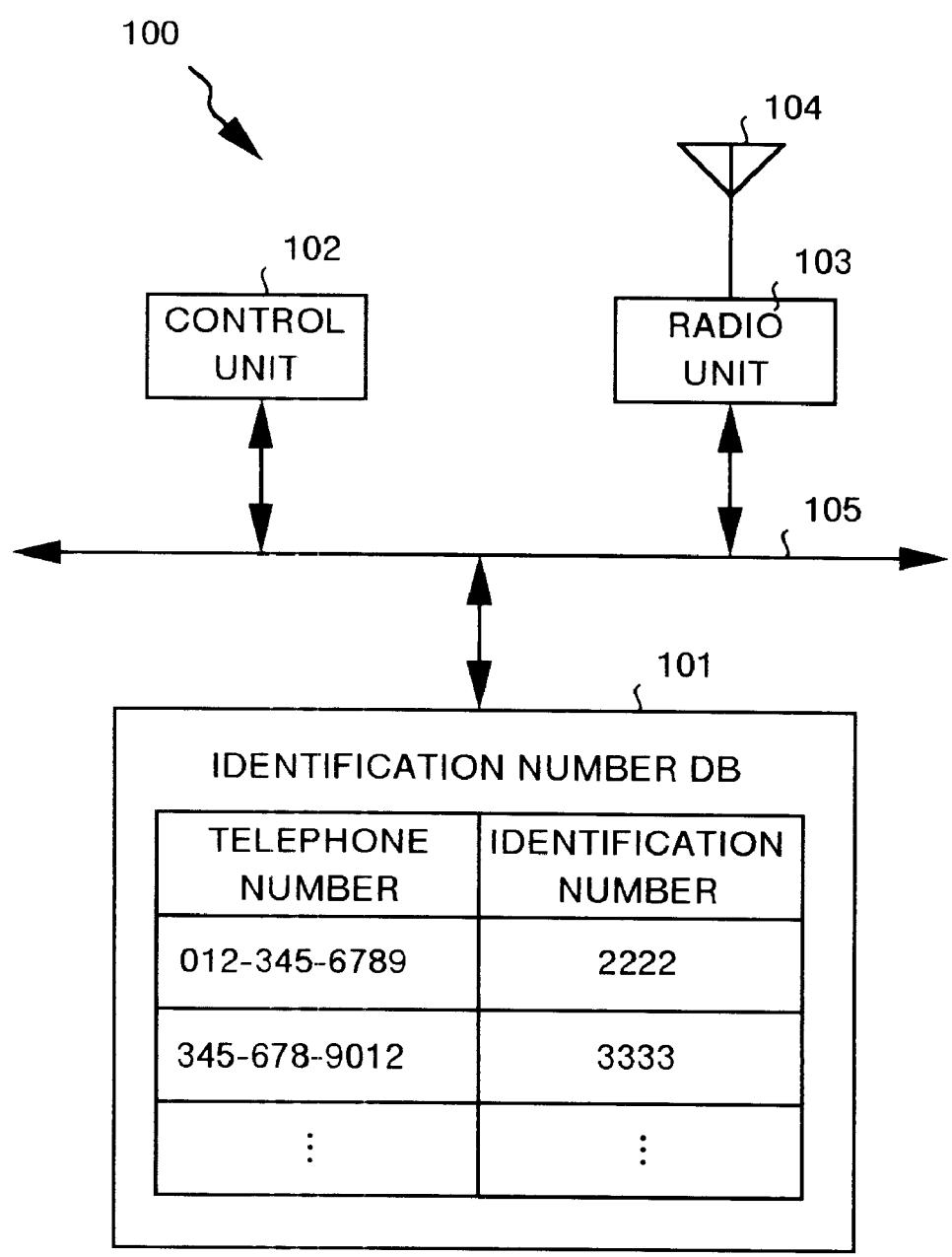
FIG. 5 is a block diagram showing internal configuration of a base station according to Embodiment 2.

Next detailed description is made for the base station 100. FIG. 5 is a block diagram showing internal configuration of the base station 100 according to Embodiment 2. The base station 100 shown in FIG. 5 comprises units such as the identification-number DB 101, a control unit 102, a radio unit 103, an antenna 104 each connected to a bus 105.

The identification-number DB 101 previously stores therein telephone numbers correlated with identification numbers respectively each subscribing to the communication system. As an example, a telephone number of "012-345-6789" is stored therein correlated with an identification number of "2222", so that it is a must that the identification number of "2222" is included in the call-setting information by the originating user to execute the call setting. Similarly, a telephone number of "345-678-9012" is stored therein correlated with an identification number of "3333", so that it is also a must that the identification number of "3333" is included in the call-setting information by the originating user to execute the call setting.

The control unit 102 incorporates therein a microcomputer and controls radio communications with each telephone set within an area of which the base station 100 is in charge. This control unit 102 stores therein, for instance, a program for call setting following the flow chart shown in FIG. 6, and the call setting is performed according to this call-setting program.

The radio unit 103 is a unit connected to the antenna 104 for radio-signal transaction through the antenna 104. The antenna 104 captures radio waves (radio signals) sent from each telephone set (e.g. from the telephone set 200) and sends out radio waves (radio signals) to each of the telephone sets (e.g. to the telephone set 200).

Figure 6:
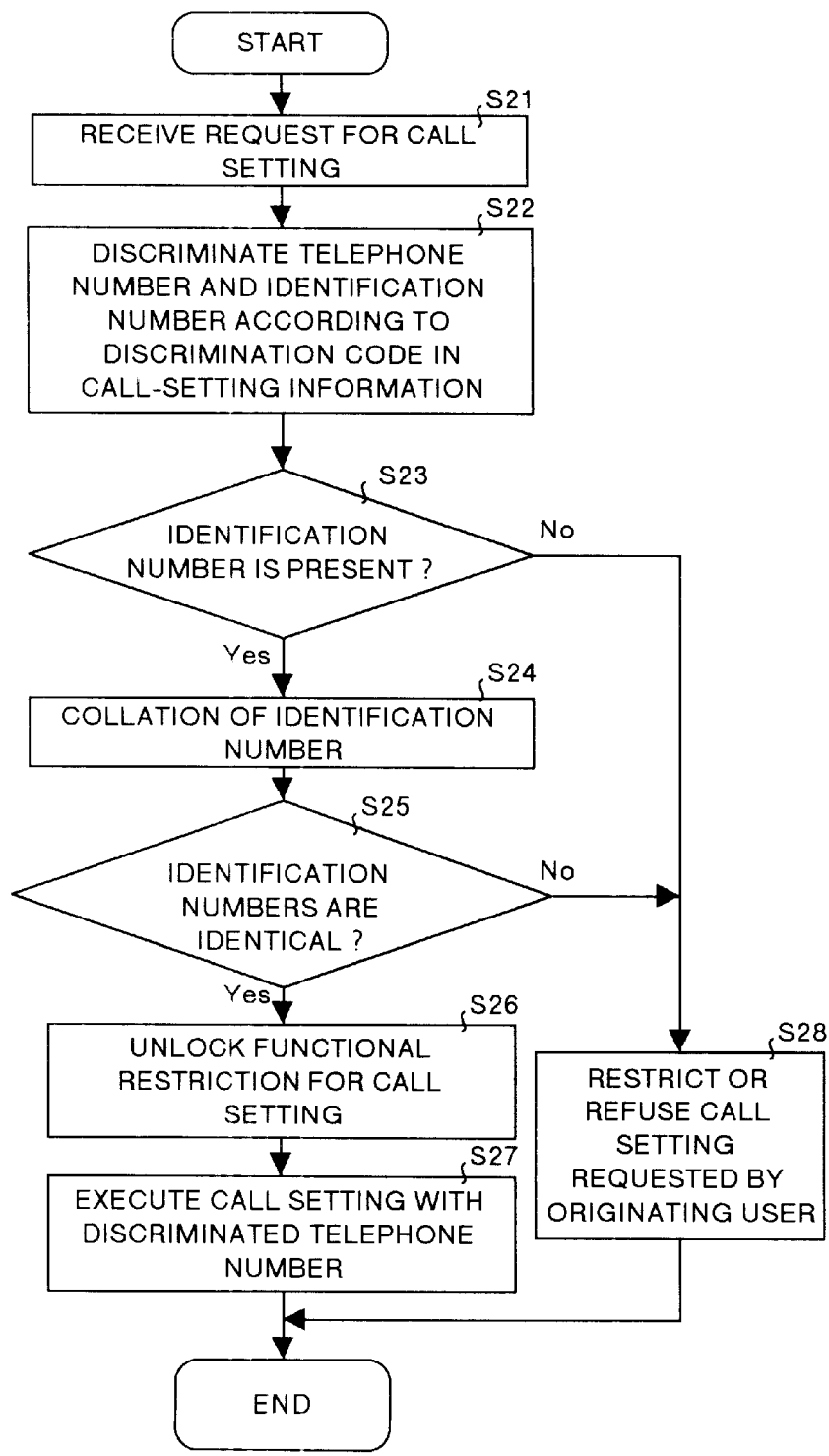
FIG. 6 is a flow chart for explanation of call-setting operations according to Embodiment 2.

Next description is made for operations. FIG. 6 is a flow chart for explanation of the operations of call setting according to Embodiment 2. When a call is to be set, like in Embodiment 1, in the telephone set 200, at first, call-setting information is inputted through key operations in the key entry section 6 in the order of a telephone number TEL, discrimination code DC, and an identification number ID.

The control section 1 confirms an end of inputting the call-setting information DT according to the operation of the "SEND" key 6b in the key entry section 6.

Then, the call-setting information DT inputted in the side of the telephone set 200 is transmitted from the telephone set 200 to the base station 100. The telephone set 200 ends all the processing for call setting allocated to the terminal side by operating this transmission. Namely, in Embodiment 2, the identifying operation of identification numbers before call setting is executed is allocated to the base station 100.

In the base station 100, a request for call setting is received according to reception of the call-setting information DT from the telephone set 100 (step S21). Then, before the call setting is executed, discrimination code DC is detected from the call-setting information DT received in step S21. When the discrimination code DC is detected in this detecting operation, it is determined according to the detected discrimination code DC that, in the inputted call-setting information DT, the data arranged before the discrimination code DC is a telephone number TEL and the data arranged after the discrimination code DC is an identification number ID. With this determination, the inputted call-setting information DT is separated into the telephone number TEL and the identification number ID, and each of the numbers is stored in the RAM of the control unit 102 as one unit of discrete data respectively.

When the discrimination code DC is not detected from the received call-setting information DT, it is determined that an identification number ID does not exist in the call-setting information DT, which makes it impossible to discriminate the telephone number from the identification number (step S22).

Accordingly, when an identification number ID is present therein (step S23), the identification number previously stored in the identification-number DB 101 and the identification number ID discriminated in step S22 are verified against each other (step S24). Herein, the identification number used for verification in the identification-number DB 101 is the identification number correlated with the telephone number TEL discriminated in step S22 stored therein because telephone numbers TEL are correlated with identification numbers ID one by one.

As a result of the verification therebetween, when it is determined that the identification numbers are identified to each other (step S25), the functional restriction for call setting (the locking function and function of restricting particular numbers each described in Embodiment 1) preset in the side of the base station 100 is unlocked (step S26).

As described above, when the functional restriction for call setting is unlocked, the telephone number TEL discriminated in step S22 is read out from the RAM, and the call setting is executed according to the telephone number TEL (step S27).

When discrimination can not be executed in step S22 and existence of an identification number in data is not recognized in step S23, or when the identification numbers are not identified to each other, it is determined that the current request for call setting from the telephone set 200 does not satisfy the necessary conditions. As a result, the call setting requested by the originating user (the telephone set 200) is refused (e.g. the locking function) or restricted (e.g. the function of restricting a particular number) according to the functional restriction for call setting preset in the base station 100 (step S28).

As described above, with Embodiment 2, the side of the telephone set 200 inputs call-setting information including a telephone number and an identification number at the time of setting a call to transmit the data to the base station, and the base station 100 receives the call-setting information, discriminates an identification number from the call-setting information to be verified against the previously stored identification number, and only when it is determined that both the identification numbers are identified to each other, the specified call restriction is unlocked to execute the call setting, so that an inputting operation at the time of setting a call in the side of the telephone set 200 can be executed with one operation, which makes it possible to simplify operations for call setting following the security functions on the system.

In Embodiment 1, the call setting is restricted or refused when an identification number is not present in call-setting information, however, like in Embodiment 3 described below, re-entry of an identification number may be requested to the user just in case it is failed to be inputted or some other reason.

A telephone set according to Embodiment 3 is configured by the blocks shown in FIG. 1 like that in Embodiment 1, so that the same reference numerals are assigned to the units corresponding to those in FIG. 1, and description on the configuration and the functions is omitted herein.

Next description is made for operations. In this description on the operations, the same step numbers are assigned to each of the processing corresponding to those in Embodiment 1, so that description thereof is omitted herein, and description is made herein only for different processing therefrom.

Figure 7:
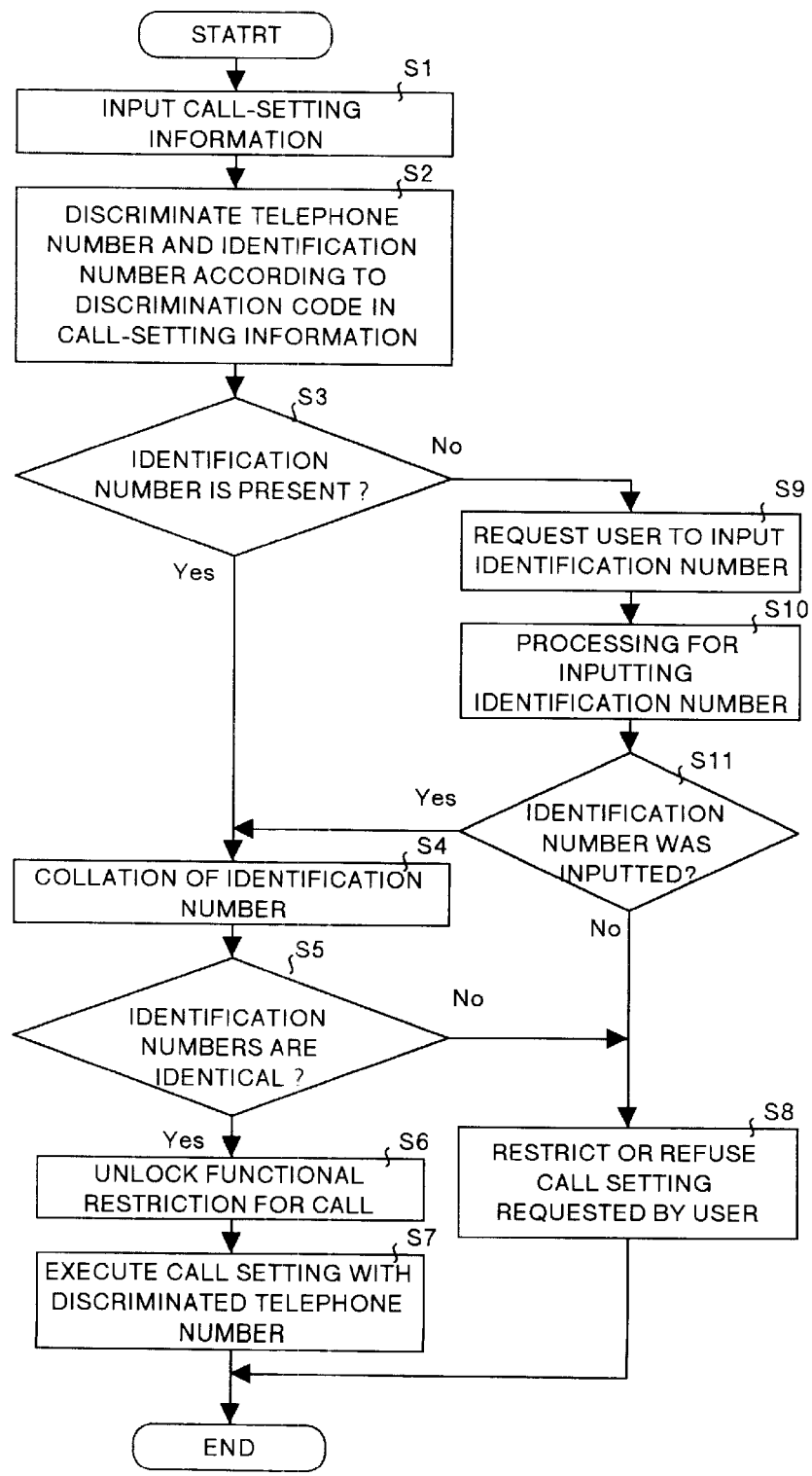
FIG. 7 is a flow chart for explanation of call-setting operations according to Embodiment 3 of the present invention.

FIG. 7 is a flow chart for explanation of operations for call setting according to Embodiment 3 of the present invention. In Embodiment 3, like in Embodiment 1, the operations from step S1 to step S8 are executed, however, when existence of an identification number can not be recognized in data, re-entry of an identification number is requested to the user.

Namely, when existence of an identification number ID therein could not be recognized in data in step S3, the processing shifts to step S9 and requests input of the identification number to the user before the operation is shifted to execution of the call setting. There are used methods, for this request, of displaying the request indicating re-entry of the identification number by the user on the display section 7 as a message thereto, of outputting it through the speaker 9 as an aural guidance, or of outputting it through the speaker 9 as a notice sound.

After this operation, when the key operation by the user is detected, the received characters are accepted as an identification number (step S10). However, when the telephone set is made to execute other function with the function keys, other processing corresponding to the function keys is executed by departing from the flow chart shown in FIG. 7.

When reception of the identification number could be recognized in step S11, the processing shifts to step S4, and the identification numbers are verified against each other as described above. After this operation and on, the same processing as that in Embodiment 1 is executed. It should be noted that the code "*" has to be provided in front of a numeric array of the identification number to recognize an identification number. Namely, to input an identification number, the user has to input the discrimination code "*" beforehand, so that the characters following the discrimination code "*" can be recognized as an identification number.

When reception of the identification number could not be recognized in step S11, the processing shifts to step S8, and the call setting is restricted or refused as described above.

As described above, with Embodiment 3, an identification number is inputted again in a case where an identification number can not be discriminated from the data, so that correct input can be completed before the call setting is executed even if an identification number is incorrectly inputted or an identification number is failed to be inputted, which makes it possible to prevent call setting from being re-set before its start.

In Embodiment 2, the call setting is restricted or refused in the base station when an identification number is not present in call-setting information, however, like in Embodiment 4 described below, the base station may request re-entry of an identification number to the telephone set just in case it is failed to be inputted or some other reason.

A base station and a telephone set according to Embodiment 4 are configured by the blocks shown in FIG. 4 and FIG. 5 like those in Embodiment 2, so that the same reference numerals are assigned to the units corresponding to those in FIG. 4 and FIG. 5, and description on the configuration and the functions is omitted herein.

Next description is made for operations. In this description on the operations, the same step numbers are assigned to each of the processing corresponding to those in Embodiment 2, so that description thereof is omitted herein, and description is made herein only for different processing therefrom.

Figure 8:
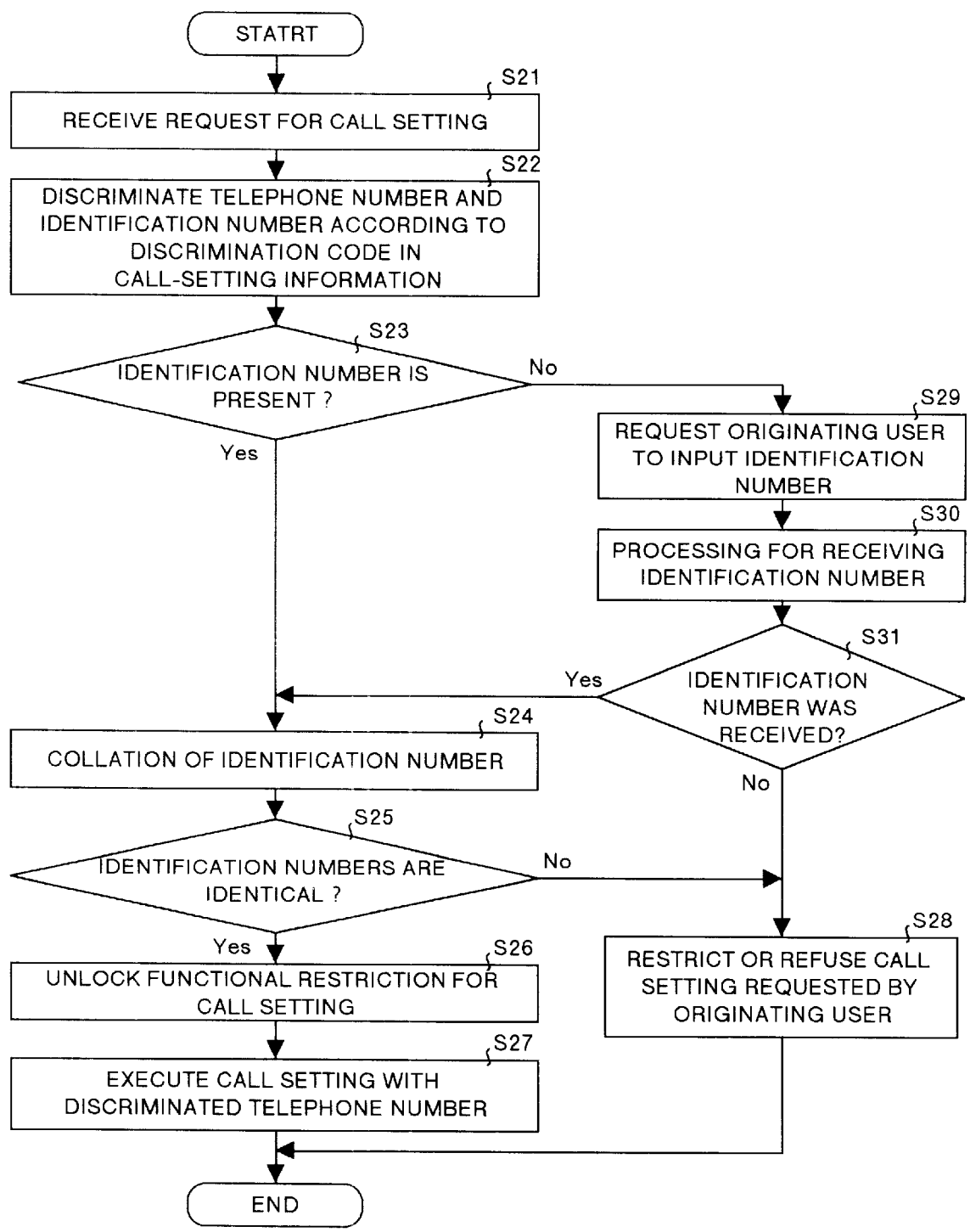
FIG. 8 is a flow chart for explanation of call-setting operations according to Embodiment 4 of the present invention.

FIG. 8 is a flow chart for explanation of operations for call setting according to Embodiment 4 of the present invention. In Embodiment 4, like in Embodiment 2, the operations from step S21 to step S28 are executed, however, when existence of an identification number can not be recognized in data in the base station, re-entry of an identification number is requested to the telephone set of the originating user.

Namely, when existence of an identification number ID therein could not be recognized in data in step S23, the processing shifts to step S29 and requests input of the identification number to the telephone set of the originating user before the operation is shifted to execution of the call setting. The telephone set having received the request therefrom uses methods, to notice it to the user, of displaying the request indicating re-entry of the identification number by the user on the display section 7 as a message thereto, of outputting it through the speaker 9 as an aural guidance, or of outputting it through the speaker 9 as a notice sound.

After this operation, when an identification number is transmitted from the telephone set of the originating user, the received characters are accepted as an identification number (step S30). However, when the line is requested to be disengaged or the like from the telephone set, other processing in response to the request is executed by departing from the flow chart shown in FIG. 8.

When reception of the identification number could be recognized in step S31, the processing shifts to step S24, and the identification numbers are verified against each other as described above. After this operation and on, the same processing as that in Embodiment 1 is executed. It should be noted that the code "*" has to be provided in front of a numeric array of the identification number to recognize the identification number, and for this reason, to input an identification number by the originating user, the user has to input the discrimination code "*" beforehand, so that the characters following the discrimination code "*" constitute an identification number.

When reception of the identification number could not be recognized in step S31, the processing shifts to step S28, and the call setting is restricted or refused as described above.

As described above, with Embodiment 4, the telephone number as well as the identification number inputted with one operation in the side of the telephone set are discriminated from each other with the discrimination code in the side of the base station, so that, when call-setting information is to be inputted in the side of the telephone set, an telephone number as well as an identification number can continuously be inputted if the discrimination code is inputted therebetween, so that the side of the base station can process verification of the identification number as well as call setting as a single unit.

In Embodiment 1, there is not described in detail on re-setting of restriction of the functions needed after the functional restriction has been unlocked for execution of call setting, however, like in Embodiment 5 described below, restriction of the functions may be programmed to automatically be re-set after execution of the call setting.

A telephone set according to Embodiment 5 is configured by the blocks shown in FIG. 1 like that in Embodiment 1, so that the same reference numerals are assigned to the units corresponding to those in FIG. 1, and description on the configuration and the functions is omitted herein.

Next description is made for operations. In this description on the operations, the same step numbers are assigned to each of the processing corresponding to those in Embodiment 1, so that description thereof is omitted herein, and description is made herein only for different processing therefrom.

Figure 9:
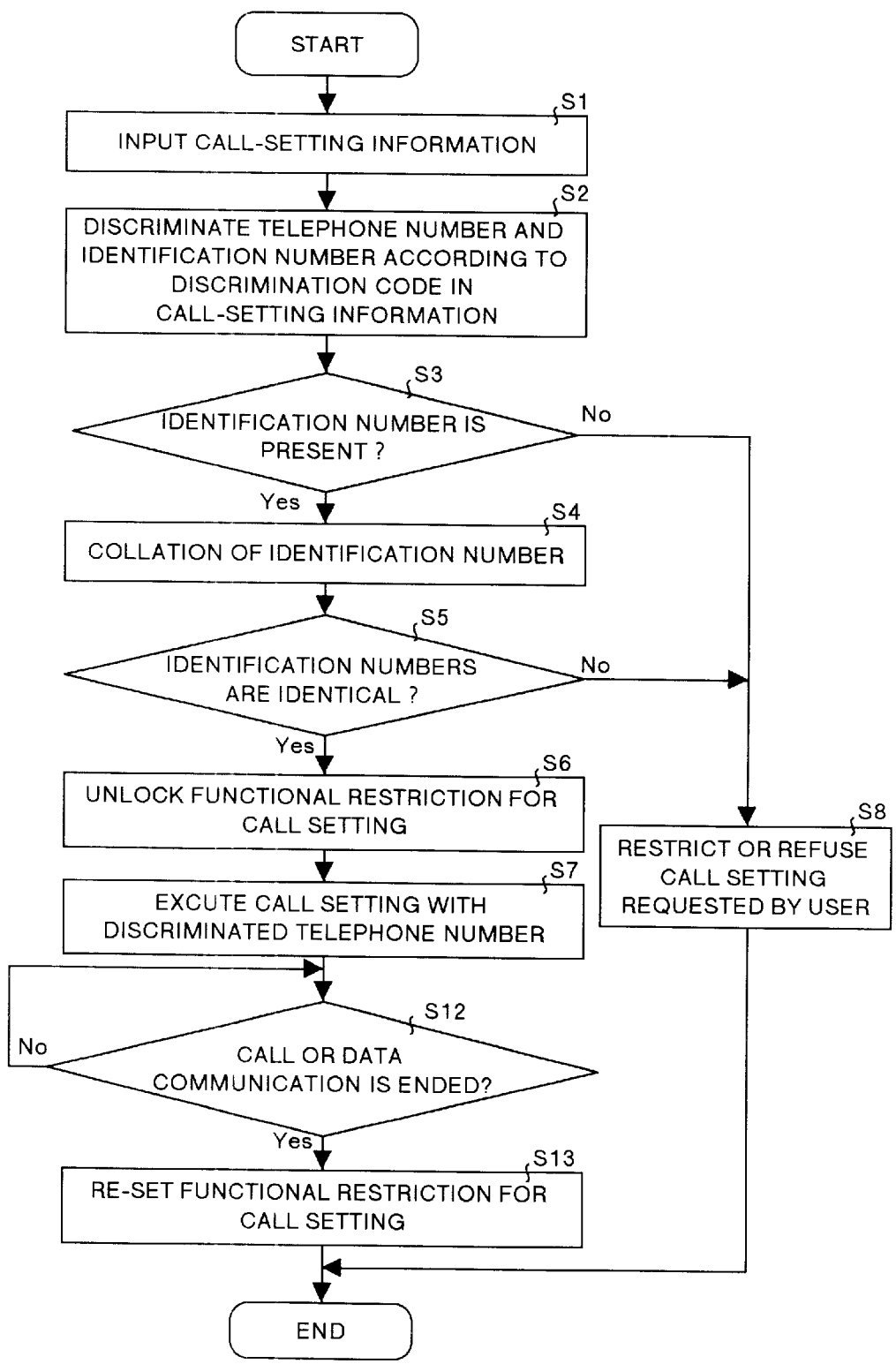
FIG. 9 is a flow chart for explanation of call-setting operations according to Embodiment 5 of the present invention.

FIG. 9 is a flow chart for explanation of operations for call setting according to Embodiment 5 of the present invention. In Embodiment 5, like in Embodiment 1, the operations from step S1 to step S8 are executed, however, the telephone set has processing for re-setting the functional restriction therefor after the call setting is executed.

After the functional restriction is unlocked in step 6, and when the call setting starts to be executed in step 7, the unlocked state thereof is maintained during the execution. Then, when a call or a data communication is ended according to the call setting (step S12), the processing shifts to step S13 to re-set the functional restriction. With this re-setting, the functional restriction having been set before being unlocked in step S6 is recovered.

As described above, with Embodiment 5, even if call restriction is unlocked once for execution of call setting, the call restriction is programmed to automatically be re-set after its being unlocked, so that it will not be failed to set the call restriction and inconvenience due to re-setting of the call restriction can be eliminated, which makes it possible to simplify the setting operations for security functions under such a condition that the security functions have been assured during the operations.

In Embodiment 2, there is not described in detail on re-setting of restriction of the functions needed after the functional restriction has been unlocked for execution of call setting, however, like in Embodiment 6 described below, restriction of the functions may be programmed to automatically be re-set after execution of the call setting.

A base station 100 and a telephone set 200 according to Embodiment 6 are configured by the blocks shown in FIG. 4 and FIG. 5 like those in Embodiment 2, so that the same reference numerals are assigned to the units corresponding to those in FIG. 4 and FIG. 5, and description on the configuration and the functions is omitted herein.

Next description is made for operations. In this description on the operations, the same step numbers are assigned to each of the processing corresponding to those in Embodiment 2, so that description thereof is omitted herein, and description is made herein only for different processing therefrom.

Figure 10:
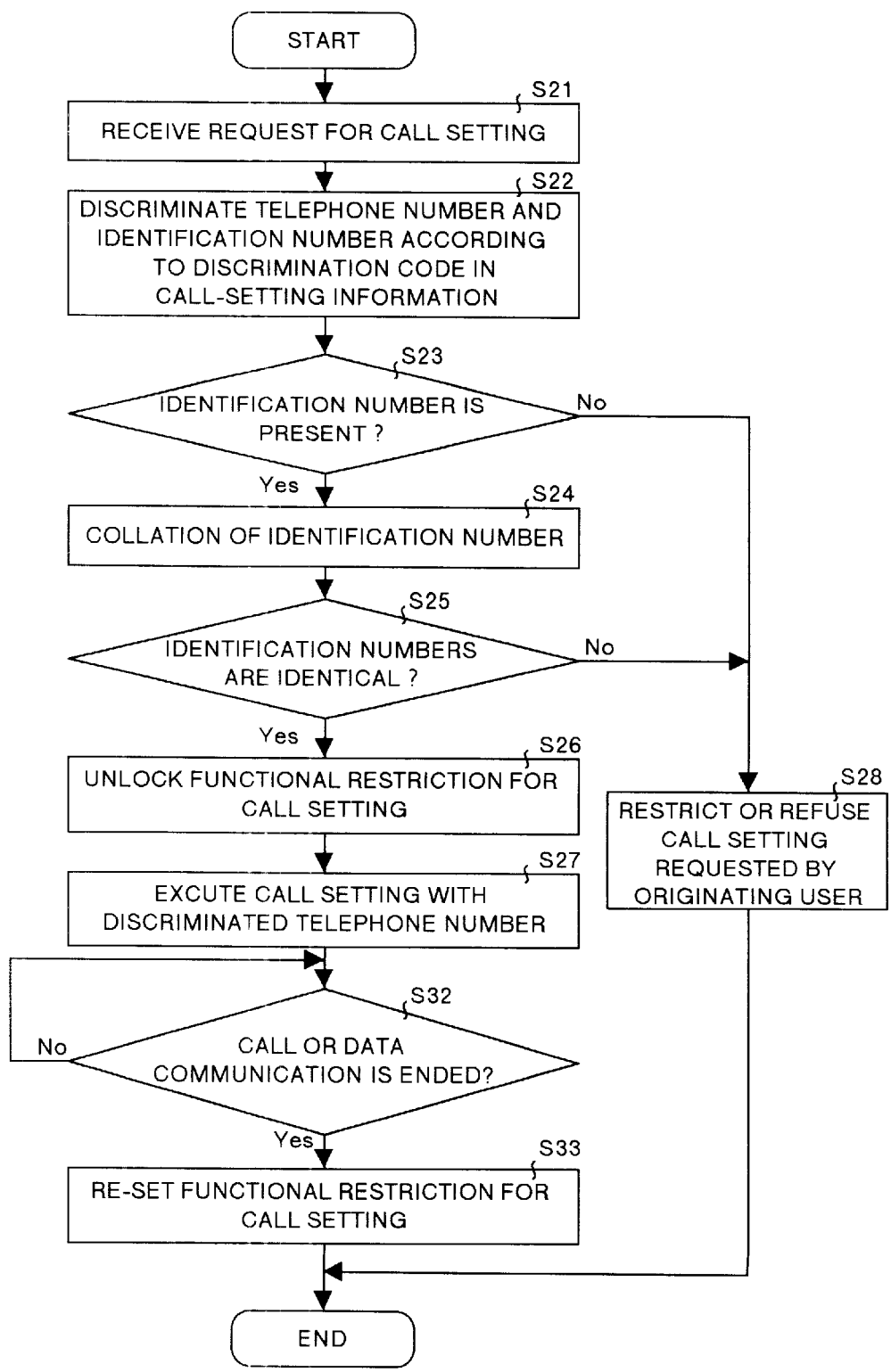
FIG. 10 is a flow chart for explanation of call-setting operations according to Embodiment 6 of the present invention.

FIG. 10 is a flow chart for explanation of operations for call setting according to Embodiment 6 of the present invention. In Embodiment 6, like in Embodiment 2, the operations from step S21 to step S28 are executed, however, the telephone set has processing for re-setting the functional restriction therefor after the call setting is executed.

After the functional restriction is unlocked in step S26, and when the call setting starts to be executed in step S27, the unlocked state thereof is maintained during the execution. Then, when a call or a data communication is ended according to the call setting (step S32), the processing shifts to step S33 to re-set the functional restriction. With this re-setting, the functional restriction having been set before being unlocked in step S26 is recovered.

As described above, with Embodiment 6, even if call restriction is unlocked once for execution of call setting, the call restriction is programmed to automatically be re-set after its being unlocked, so that setting the call restriction is not a load on the side of the telephone set and inconvenience due to re-setting of the call restriction can also be eliminated therein, which makes it possible to simplify the setting operations for security functions under such a condition that the security functions have been assured during the operations on the system.

Herein, combination of the invention according to Embodiment 3 and that according to Embodiment 5 is made as an invention according to Embodiment 7, and re-entry of an identification number may be requested to the user just in case it is failed to be inputted or some other reason and the functional restriction may automatically be re-set after execution of the call setting.

A telephone set according to Embodiment 7 is configured by the blocks shown in FIG. 1 like that in Embodiment 1, so that the same reference numerals are assigned to the units corresponding to those in FIG. 1, and description on the configuration and the functions is omitted herein.

Next description is made for operations. In this description on the operations, the same step numbers are assigned to each of the processing corresponding to those in Embodiments 1, 3, 5, so that description thereof is omitted herein, and description is made herein only for different processing therefrom.

Figure 11:
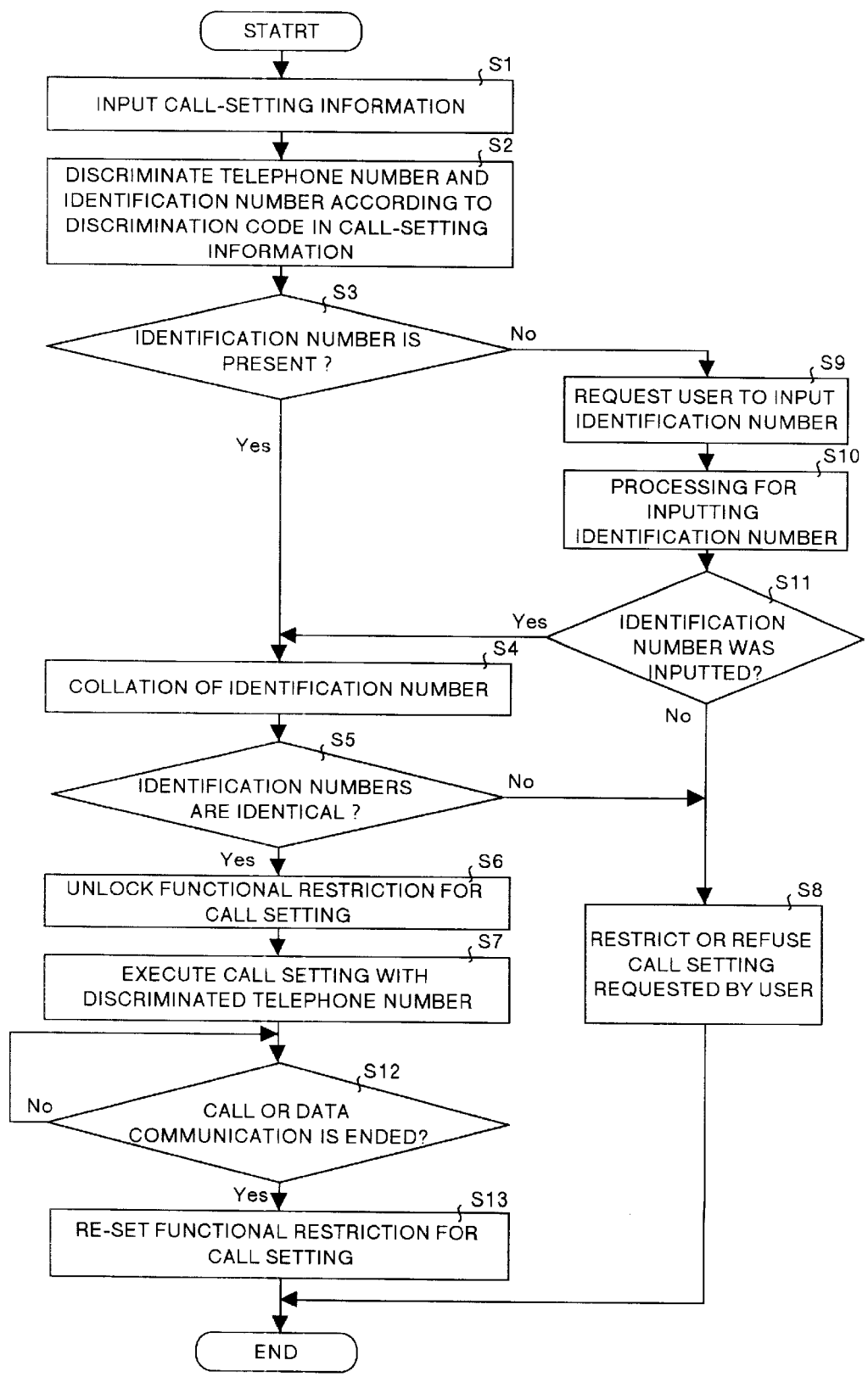
FIG. 11 is a flow chart for explanation of call-setting operations according to Embodiment 7 of the present invention.

FIG. 11 is a flow chart for explanation of operations for call setting according to Embodiment 7 of the present invention. In Embodiment 7, like in Embodiments 1, 3, 5, the operations from step S1 to step S13 are included.

Namely, when existence of an identification number ID could not be recognized in data in step S3, the processing shifts to step S9 and requests input of the identification number to the user before the operation is shifted to execution of the call setting. There are used methods, for this request, of displaying the request indicating re-entry of the identification number by the user on the display section 7 as a message thereto, of outputting it through the speaker 9 as an aural guidance, or of outputting it through the speaker 9 as a notice sound.

After this operation, when the key operation by the user is received, the received characters are accepted as an identification number (step S10). When reception of the identification number could be recognized in step S11, the processing shifts to step S4, and the identification numbers are verified against each other as described above.

After the call setting is executed in step 7, and when a call or a data communication is ended (step S12), the processing shifts to step S13 to re-set the functional restriction. With this re-setting, the functional restriction having been set before being unlocked in step S6 is recovered.

It should be noted that, when reception of the identification number could not be recognized in step S11, the processing shifts to step S8, and the call setting is restricted or refused as described above.

As described above, with Embodiment 7, an identification number is inputted again when an identification number can not be discriminated from the data, so that correct input can be completed before the call setting is executed even if an identification number is incorrectly inputted or an identification number is failed to be inputted, which makes it possible to prevent call setting from being re-set before its start.

Also, even if call restriction is unlocked once for execution of call setting, the call restriction is programmed to automatically be re-set after its being unlocked, so that the call restriction is not failed to be set in the telephone set and inconvenience due to re-setting of the call restriction can also be eliminated therein, which makes it possible to simplify the setting operations for security functions under such a condition that the security functions have been assured during the operations.

Herein, combination of the invention according to Embodiment 4 and that according to Embodiment 6 is made as an invention according to Embodiment 8, and re-input of an identification number may be requested to the telephone set just in case it is failed to be inputted or some other reason and the functional restriction may automatically be re-set after execution of the call setting.

A base station and a telephone set according to Embodiment 8 are configured by the blocks shown in FIG. 4 and FIG. 5 like those in Embodiment 2, so that the same reference numerals are assigned to the units corresponding to those in FIG. 4 and FIG. 5, and description on the configuration and the functions is omitted herein.

Next description is made for operations. In this description on the operations, the same step numbers are assigned to each of the processing corresponding to those in Embodiment 2, 4, 6, so that description thereof is omitted herein, and description is made herein only for different processing therefrom.

Figure 12:
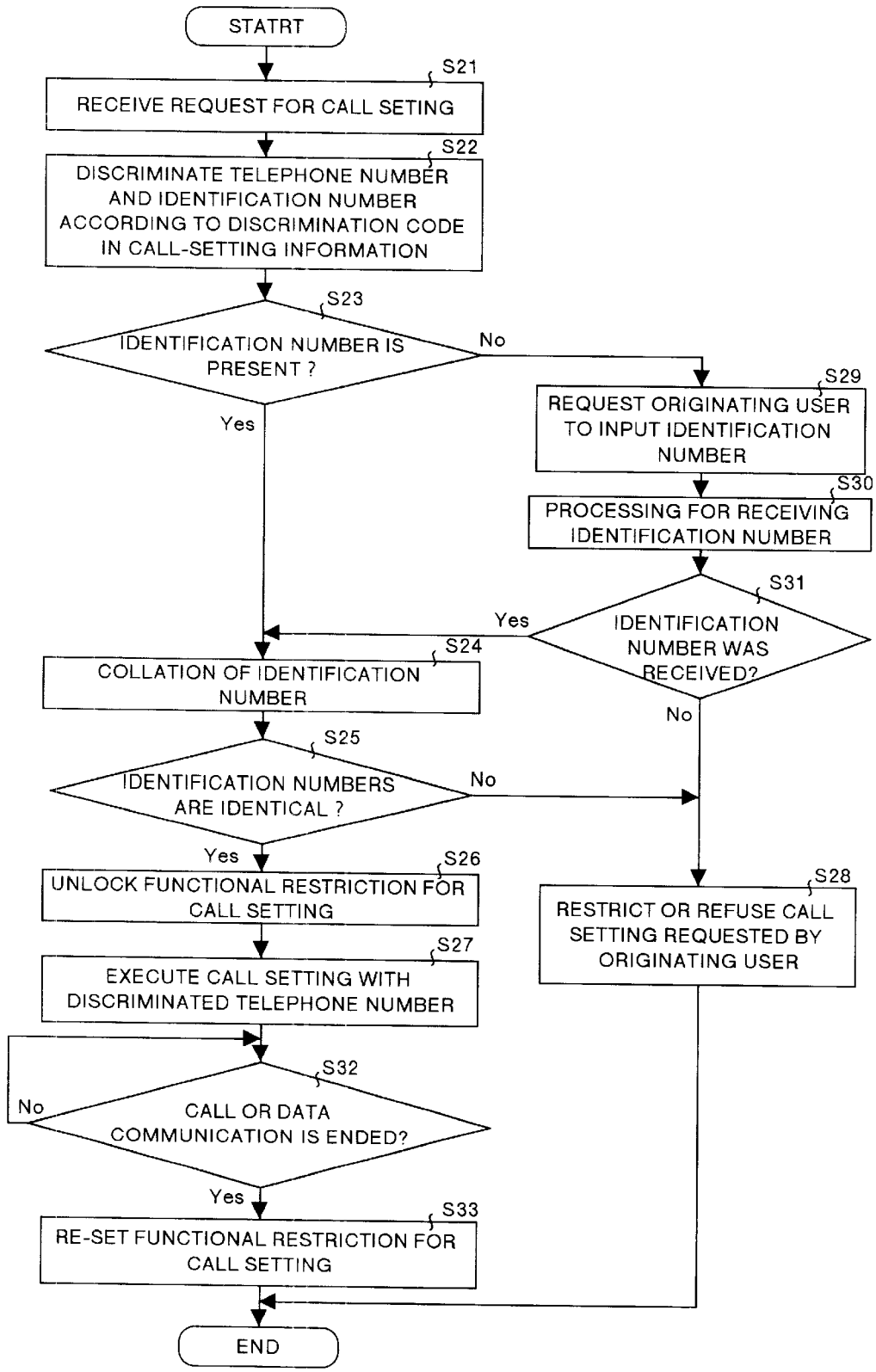
FIG. 12 is a flow chart for explanation of call-setting operations according to Embodiment 8 of the present invention.

FIG. 12 is a flow chart for explanation of operations for call setting according to Embodiment 8 of the present invention. In Embodiment 8, like in Embodiment 2, 4, 6, the operations from step S21 to step S33 are included.

Namely, when existence of an identification number ID therein could not be recognized in data in step S23, the processing shifts to step S29 and requests transmission thereto of the identification number to the telephone set of the originating user before the operation is shifted to execution of the call setting. After this operation, when an identification number is received from the telephone set thereof, the received characters are accepted as an identification number (step S30). When reception of the identification number could be recognized in step S31, the processing shifts to step S24, and the identification numbers are verified against each other as described above.

After the call setting is executed in step S27, and when a call or a data communication is ended (step S32), the processing shifts to step S33 to re-set the functional restriction. With this re-setting, the functional restriction having been set before its being unlocked in step S26 is recovered.

It should be noted that, when reception of the identification number could not be recognized in step S31, the processing shifts to step S28, and the call setting is restricted or refused as described above.

As described above, with Embodiment 8, the base station requests to the telephone set to input an identification number again when an identification number can not be discriminated from the data, so that correct input can be completed before the call setting is executed even if an identification number is incorrectly inputted or an identification number is failed to be inputted, which makes it possible to prevent call setting from being re-set before its start on the system.

Also, even if call restriction is unlocked once for execution of call setting, the call restriction is programmed to automatically be re-set after its being unlocked, so that setting of the call restriction is not a load on the side of the telephone set 200 and inconvenience due to re-setting of the call restriction can also be eliminated therein, which makes it possible to simplify the setting operations for security functions under such a condition that the security functions have been assured during the operations on the system.

In the embodiments 1 to 8, the "*" key 6a is used as discrimination code, however, any key such as a key "#" or the like may be used therefor so long as it is a key which can discriminate between a telephone number TEL and an identification number ID, namely a key other than ten key.

Also, in the embodiments 1 to 8, the discrimination code is set to one character of "*" obtained by one operation, however, it may comprises a plurality of characters, and in this case, there occur a plurality of combinations thereof as discrimination code. For this reason, call setting can be executed only when correct discrimination code and a correct identification number are inputted to a telephone set, which makes it possible to improve security effects thereof.

As described above, with the present invention, when setting a call, a user inputs call-setting information including a telephone number and an identification number; the identification number is determined from the call-setting information and is collated to the previously registered identification number; and specified call restriction is unlocked only when the inputted identification number and the previously registered one are identical. With this feature, there is provided the effect that an input operation when setting a call is to be executed only once and it is possible to simplify the operation for call setting.

With another feature of the present invention, a telephone number and an identification number inputted all at once are discriminated from each other by checking a discrimination code, and with this feature there is provided the effect that, when inputting call-setting information, it is possible to continuously input a telephone number and an identification number by inputting a discrimination code therebetween.

With another feature of the present invention, when an identification number is not determined, the user is asked to input the identification number again, so that, even if input miss for an identification number occurs or an identification number is not inputted, the user can complete input of correct information before call setting is executed, and with this feature, there is provided the effect that the necessity for retry of call setting can be eliminated.

With another feature of the present invention, even if call restriction is once unlocked for execution of call setting, the call restrictions are automatically set again, so that it is possible to prevent a user from forgetting execution of an operation for call restriction and also trouble for setting the cal restriction again is saved, and with this feature there is provided the effect that it is possible to simplify an operation for setting the security function while maintaining the security function.

With another feature of the present invention, when setting a call, a user inputs call-setting information including a telephone number and an identification number in the side of a telephone set; the call-setting information is transmitted to a base station; the base station receives the call-setting information, determines an identification number from the call-setting information to collate it to the previously registered identification number, and unlocks call restriction and executes call setting when the inputted identification number and the previously registered identification number are identical, so that an operation for inputting when setting a call is to be executed only once in the side of a telephone set, and with this feature there is provided the effect that it is possible to obtain a communication system in which the call setting operation following security functions on the system can be simplified.

With another feature of the present invention, a telephone number and an identification number inputted all at once in the side of a telephone set are discriminated by checking a discrimination code in the side of a base station, so that, when inputting call-setting information in the side of a telephone set, it becomes possible to continuously input an telephone number and an identification number on the condition that also a discrimination code is inputted, and with this feature there is provided the effect that verification of an identification number and call setting can be executed in batch in the side of the base station.

With another feature of the present invention, when an identification number inputted in the side of a telephone set can not be identified, a base station requests a user to input the identification number again, so that, even if an user makes a mistake in or forgets inputting an identification number, the user can complete a correct operation for inputting call-setting information, and with this feature, there is provided the effect that it is possible to obtain a communication system in which the necessity for executing an operation for call setting again on the system is eliminated.

With another feature of the present invention, even if call restriction is unlocked for execution of call setting, the call restriction is automatically set, so that a work load for a user to set call setting in a telephone set is eliminated and also trouble for setting the call restriction again in the side of a telephone set is saved, and with this feature there is provided the effect that it is possible to obtain a communication system in which the operation for setting security functions on the system can be simplified while maintaining the security functions.

With another feature of the present invention, call-setting information including a telephone number and an identification number is inputted when setting a call; the identification number is determined from the call-setting information and collected to a previously registered identification number; and call restriction is unlocked and call setting is executed only when the inputted identification number and the previously registered one are identical, so that an operation for inputting when setting a call is to be executed only once, and with this feature there is provided the effect that it is possible to provide a security function setting method for a telephone set in which the call setting operation following the security functions can be simplified.

With another feature of the present invention, a telephone number and an identification number inputted all at once are discriminated from each other by checking a discrimination code, so that it is possible to obtain a security function setting method for a telephone set in which a telephone number and an identification number can continuously be inputted on the condition that also a discrimination code is inputted simultaneously.

With another feature of the present invention, when an identification number can not be determined, a user is prompted to input the identification number again, so that, even if a mistakes occurs in inputting an identification number or an identification number is not inputted, the user can complete a correct operation for inputting call-setting information before call setting is executed, and with this feature there is provided to obtain a security function setting method for a telephone set in which the necessity to execute call setting again is eliminated.

With anther feature of the present invention, even if call restriction is unlocked once for execution of call setting, the call restriction is automatically set again, so that a user is prevented from forgetting execution of an operation for setting the call restriction and also a work load for setting the call restriction again is saved, and with this feature there is provided the effect that it is possible to obtain a security function setting method for a telephone set in which an operation for setting the security functions can be simplified while maintaining the security functions.

This application is based on Japanese patent application No. HEI 9-68091 filed in the Japanese Patent Office on Mar. 21, 1997, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A telephone set, comprising:
   storage means for storing therein an identification number to unlock a specified call restriction;
   inputting means for inputting all at once in a continuous sequential operation call-setting information including a telephone number and an identification number when a call is desired to be set by a user;
   discriminating means for discriminating the identification number from the telephone number in the call-setting information inputted by said inputting means;
   verifying means for verifying that the identification number discriminated by said discriminating means corresponds to the identification number stored by said storage means; and
   call-setting control means for unlocking said specified call restriction only when it is determined by said verifying means that the inputted identification number corresponds to the stored identification number and for executing the setting of a call according to the telephone number discriminated by said discriminating means.

2. A telephone set according to claim 1 further comprising:
   an identification number inputting means for inputting an identification number into the telephone set when an identification number can not be discriminated from the call-setting information by said discriminating means.

3. A telephone set according to claim 1 further comprising:
   a call-restriction re-setting means for re-setting a call restriction after the call setting is executed by said call-setting control means.

4. A telephone set, comprising:

storage means for storing therein an identification number to unlock a specified call restriction;

inputting means for inputting all at once in a continuous sequential operation call-setting information including a telephone number and an identification number when a call is desired to be set by a user;

discriminating means for discriminating the identification number from the telephone number in the call-setting information inputted by said inputting means;

verifying means for verifying that the identification number discriminated by said discriminating means corresponds to the identification number stored by said storage means; and call-setting control means for unlocking said specified call restriction only when it is determined by said verifying means that the inputted identification number corresponds to the stored identification number and for executing the setting of a call according to the telephone number discriminated by said discriminating means;

wherein said inputting means inserts a discrimination code between said telephone number and said identification number to discriminate said telephone number from said identification number in said call-setting information, and said discriminating means discriminates one from the other according to the discrimination code inserted by said inputting means.

5. A telephone set according to claim 4 further comprising:

an identification number inputting means for inputting an identification number into the telephone set when an identification number can not be discriminated from the call-setting information by said discriminating means.

6. A telephone set according to claim 4 further comprising:

a call-restriction re-setting means for re-setting a call restriction after the call setting is executed by said call-setting control means.

7. A communication system for executing communications according to a call setting between a telephone set and a base station, wherein the telephone set comprises:

inputting means for inputting all at once in a continuous sequential operation call-setting information including a telephone number and an identification number when a call is desired to be set by a user;

transmitting means for transmitting the telephone number and the identification number to said base station according to the call-setting information inputted by said inputting means;

wherein said base station comprises:

storage means for storing therein an identification number to unlock a specified call restriction;

receiving means for receiving the call-setting information transmitted from said transmitting means;

discriminating means for discriminating the identification number from the telephone number in the call-setting information received by said receiving means;

verifying means for verifying that the identification number discriminated by said discriminating means corresponds to the identification number stored by said storage means; and call-setting control means for unlocking said specified call restriction only when it is determined by said verifying means that the inputted identification number corresponds to the stored identification number and for executing the setting of a call according to the telephone number discriminated by said discriminating means.

8. A communication system according to claim 7 further comprising:

an identification number requesting means for requesting an identification number to said telephone set when an identification number can not be discriminated from the call-setting information by said discriminating means.

9. A communication system according to claim 7 further comprising:

a call-restriction re-setting means for re-setting a call restriction after the call setting is executed by said call-setting control means.

10. A communication system according to claim 7, wherein said inputting means inserts a discrimination code between said telephone number and said identification number to discriminate said telephone number from said identification number in said call-setting information, and said discriminating means discriminates one from the other according to the discrimination code inserted by said inputting means.

11. A communication system according to claim 10 further comprising:

an identification number requesting means for requesting an identification number to said telephone set when an identification number can not be discriminated from the call-setting information by said discriminating means.

12. A communication system according to claim 10 further comprising:

a call-restriction re-setting means for re-setting a call restriction after the call setting is executed by said call-setting control means.

13. A method of setting security functions in a telephone set, comprising:

a first step of inputting all at once in a continuous sequential operation call-setting information including a telephone number and an identification number when a call is desired to be set by a user;

a second step of discriminating the identification number from the telephone number in the call-setting information inputted in said first step;

a third step of verifying that the identification number discriminated in said second step corresponds to a predefined identification number for unlocking a specified call restriction; and a fourth step of unlocking said specified call restriction only when it is determined in said third step that the inputted identification number corresponds to the stored identification number and for executing the setting of a call according to the telephone number discriminated in said second step.

14. A method of setting security functions in a telephone set according to claim 13 further comprising:

a fifth step of inputting an identification number once again into the telephone set when an identification number can not be discriminated from the data in said second step.

15. A method of setting security functions in a telephone set according to claim 13 further comprising: a sixth step of re-setting the call restriction after the call setting is executed in said fourth step.

16. A method of setting security functions in a telephone set according to claim 13; wherein, in said first step, discrimination code to discriminate a telephone number from an identification number as said call-setting information is inputted into the telephone set, and in said second step, discrimination of one from the other is executed according to the discrimination code inputted in said first step.

17. A method of setting security functions in a telephone set according to claim 16 further comprising:
a fifth step of inputting an identification number into the telephone set when an identification number can not be discriminated from the call-setting information in said second step.

18. A method of setting security functions in a telephone set according to claim 16 further comprising: a sixth step of re-setting the call restriction after the call setting is executed in said fourth step.

* * * * *

UNITED STATES PATENT AND TRADEMARK OFFICE
CERTIFICATE OF CORRECTION

PATENT NO. : 6,253,095 B1
DATED : June 26, 2001
INVENTOR(S) : Bunji Ushida

It is certified that error appears in the above-identified patent and that said Letters Patent is hereby corrected as shown below:

<u>Title page, Item [54] and Column 1, line 1,</u>
Title, "COMMUNICATIONS" should be -- COMMUNICATION --.
<u>Title page,</u>
Before the Item [57], ABSTRACT, insert the following:
-- [74] *Attorney, Agent, or Firm* - Rothwell, Figg, Ernst & Manbeck --.

Signed and Sealed this

Twenty-seventh Day of May, 2003

JAMES E. ROGAN
*Director of the United States Patent and Trademark Office*